United States Patent [19]

Harapanahalli

[11] Patent Number: 5,064,515

[45] Date of Patent: * Nov. 12, 1991

[54] ELECTROFILTER APPARATUS AND PROCESS FOR PREVENTING FILTER FOULING IN CROSSFLOW FILTRATION

[75] Inventor: Muralidhara Harapanahalli, Dublin, Ohio

[73] Assignee: Battelle Memorial Institute, Columbus, Ohio

[*] Notice: The portion of the term of this patent subsequent to Aug. 27, 2008 has been disclaimed.

[21] Appl. No.: 374,581

[22] Filed: Jun. 30, 1989

Related U.S. Application Data

[63] Continuation of Ser. No. 224,029, Jul. 11, 1988, abandoned, which is a continuation-in-part of Ser. No. 74,738, Jul. 17, 1987, abandoned.

[51] Int. Cl.$^5$ .............................................. C02F 1/46
[52] U.S. Cl. .................................. 204/151; 204/182.3; 204/186; 204/260; 204/263; 204/264; 204/276; 204/283; 204/302; 210/748
[58] Field of Search .................. 204/180.1, 182.3, 186, 204/252, 260, 263, 276, 282–283, 295–296, 302, 151; 210/748, 500.23

[56] References Cited

U.S. PATENT DOCUMENTS

| | | | |
|---|---|---|---|
| 2,571,247 | 10/1951 | Huebotter | 204/180 |
| 3,980,541 | 9/1976 | Aine | 204/186 |
| 4,032,454 | 6/1977 | Hoover et al. | 210/323 R |
| 4,057,479 | 11/1977 | Campbell | 204/258 |
| 4,100,068 | 7/1978 | Jordan et al. | 204/300 R |
| 4,111,768 | 9/1978 | Schmidt | 204/151 |
| 4,130,473 | 12/1978 | Eddleman | 204/151 |
| 4,224,135 | 9/1980 | Gidaspow et al. | 204/302 |
| 4,269,681 | 5/1981 | Watson et al. | 204/188 |
| 4,276,146 | 6/1981 | Coker et al. | 204/266 |
| 4,343,690 | 8/1982 | de Nora | 204/263 |
| 4,376,022 | 3/1983 | Porta et al. | 204/180 R |
| 4,421,579 | 12/1983 | Covitch et al. | 156/60 |
| 4,601,799 | 7/1986 | Froberger et al. | 204/181.8 |
| 4,604,174 | 8/1986 | Bollinger et al. | 204/301 |
| 4,617,128 | 10/1986 | Ostreicher | 210/679 |
| 4,620,917 | 11/1986 | Nozawa et al. | 204/302 |
| 4,707,229 | 11/1987 | Dempsey et al. | 204/283 |

FOREIGN PATENT DOCUMENTS 2567914 1/1986 France.

OTHER PUBLICATIONS

Moulik, S. P.; *Physical Aspects of Electrofiltration*; 1971; 771-776; Environmental Science & Technology.

(List continued on next page.)

Primary Examiner—John F. Niebling
Assistant Examiner—Kathryn Gorgos
Attorney, Agent, or Firm—Klaus H. Wiesmann

[57] ABSTRACT

An apparatus and method for continuously removing liquid from an aqueous suspension; the apparatus consists of a filter housing; an electrofilter disposed within the housing to provide a crossflow chamber and filtrate chamber within the housing; an inlet for supplying a suspension to the crossflow chamber and an outlet for removing a suspension reduced in liquid content from the crossflow chamber; both the inlet and the outlet may be disposed so as to provide a crossflow of the suspension across the surface of the elecltrofilter or disposed to provide a batch process with optional stirring; and an outlet for removing liquid from the filtrate chamber. The filter material of the electrofilter is conductive so that the filter material functions as the first electrode as well as a filter. A second electrode is disposed on the filtrate side of the electrofilter.

A method for continuously separting a liquid from an aqueous suspension while reducing membrane or filter fouling includes providing a crossflow apparatus having an electrofilter disposed therein; pumping the aqueous suspension into the crossflow apparatus at a pressure adapted to cause flow of filtrate through the electrofilter; and concurrently with pumping the suspension into the apparatus supplying electrical energy to the electrofilter at a voltage adapted to reduce fouling of the electrofilter.

17 Claims, 9 Drawing Sheets

OTHER PUBLICATIONS

Bier, Milan; *Electrophoresis as an Industrial Process*; 1971; pp. 84–92; Symposium 68th National Meeting of Chemical Engineers, Houston, Texas.

Henry, Jr., J. D. et al.; *A Solid/Liquid Separation Process Based on Cross Flow and Electrofiltration*; 1977; pp. 851–859, AICHE Journal.

Radovich, J. M.; *Coupling Electrophoresis with Ultrafiltration for Improved Processing of Plasma Proteins*; 1980; pp. 1491–1497; Separation Science and Technology.

Yukawa, H. et al.; *Cross Flow Electro-Ultrafiltration for Colloidal Solution of Protein*; 1983; pp. 305–311; Journal of Chemical Engineers of Japan.

Bollinger, J. M. et al.; *Electrofiltration of Ultrafine Aqueous Dispersions*; 1984; pp. 54–58; CEP.

Electrokinetic Membrane Processes; Membrane Processes in Industry and Biomedicine; Milan Bier; Plenum Press; N. Y., London; 1971; pp. 233–266.

Membranes in downstream processing; Mihn S. Le et al.; The Chemical Engineer; Jul./Aug. 1985; pp. 48–53.

*Novel Ceramic Fabrication Processes and Applications*; R. W. Davidge, Editor; An Electronic Membrane from a Sol-Gel Process; C. Guizard et al.; British Ceramic Proceedings; vol. 38; 1986; pp. 263–274.

Membrane Fouling Prevention in Crossflow Microfiltration by the Use of Electric Fields; R. J. Wakeman et al.; Chemical Engineering Science; vol. 42, No. 4; 1987; pp. 829–842.

ELECTROFILTER APPARATUS AND PROCESS FOR PREVENTING FILTER FOULING IN CROSSFLOW FILTRATION

This is a continuation of copending application Ser. No. 07/224,029 filed on July 11, 1988, now abandoned which is a continuation in part of Ser. No. 07/074,738, filed 07/17/87, now abandoned.

FIELD OF THE INVENTION

This invention relates to an apparatus and a method for preventing membrane or filter fouling. The apparatus and method have utility in reducing the fouling problems associated with the use of filters and membranes to separate liquids and solids and in fractionation.

BACKGROUND OF THE INVENTION

Membrane processes have been applied to a wide variety of industrial separation processes for process schemes requiring either concentration or purification of aqueous streams ranging from clarification of juices, removal of products from fermentation broths and desalination of brackish waters, etc. Some of the processes described above have been demonstrated on an industrial scale. This technology has been possible due to the development of new membranes which exhibit a high degree of hydraulic permeability coupled with ability to retain small molecules.

The membrane filtration process is, however, adversely affected by two phenomena, namely, concentration polarization and fouling. Concentration polarization is caused by the accumulation of solute molecules at the upstream surface of the membrane. This phenomena causes a reduction in the efficiency and of rate of the membrane filtration process. Concentration polarization is generally a hydrodynamic and diffusion phenomena.

Fouling also occurs with a variety of feeds including proteins and colloids. Fouling can be the result of an insoluble precipitate/ particle or gel layer within the pores (plugging) or the result from build-up on the surface of the membrane itself. It has been reported in the literature that up to 100 micron thick gel layers can be formed over a period of 24 hours as a result of the denaturation of proteins. The presence of fat globules can also be responsible for formation of gel layers.

Such gel layers and plugging are responsible for decreases in membrane flux and, hence, affect product throughput and economics. Various methods of treating fouling and concentration polarization have been reported in the literature but have only had limited success in minimizing the problem. Some of these methods are heat treatment with pH adjustment, immobilized protease treatment and membrane scouring.

Some typical industrial applications of membrane separation in the food and beverage industry are removal of casein, fats and lactose from whey; clarification of liqueur and vodkas; sterilization of liquids, e.g. beer, wine; continuous microfiltration of vinegar; and concentration and demineralization of cheese, whey, soy whey and vegetable extracts. Other applications in the wastewater treatment industry include removal of cyanides from electroplating wastewaters; reuse of wastewater from ammunition manufacture; recovery and recycling of sewage effluent; and recovery of starch and proteins from starch factory waste, wood pulp and paper processing. Further applications are listed in an article by Minh S. Le et al, *The Chemical Engineer*, pp. 48–53, July/August 1985.

Previous work in this area includes the following U.S. Pat. Nos.: 2,571,247; 3,980,541; 4,032,454; 4,057479; 4,100,068; 4,224,135; 4,269,681; 4,276,146; 4,343,690; 4,421,579; and 4,617,128.

Membrane separation techniques typical of the prior art include those that employ classical crossflow electrofiltration. Several good review articles that give an excellent background discussion include: Electrokinetic Membrane Processes, Milan Bier, *Membrane Processes in Industry and Biomedicine*, Milan Bier—Editor. Plenum Press, N.Y.-London, (1971) pp. 233–266; A Solid/-Liquid Separation Process Based on Cross Flow and Electrofiltration, J. D. Henry, Jr., et al, AIChE Journal, Vol. 23, No. 6. November 1977, pp. 851–859; Membrane Fouling Prevention in Crossflow Microfiltration by the Use of Electric Fields, R. J. Wakeman et al, *Chemical Engineering Science*, Vol. 42, No. 4, pp. 829–842, 1987. In classical crossflow electrofiltration the material to be filtered passes between a first electrode and a membrane or filter with a second electrode positioned on the other side of the filter. The electrodes are energized to pull suspended particles from the material to be filtered toward the first electrode and away from the filter. Thus the suspended particles cannot deposit on the filter or membrane.

U.S. Pat. No. 4,604,174 to Bollinger et al teaches an improvement of the prior art crossflow: however, the general design follows FIGS. 1 and 2 herein that illustrate typical prior art crossflow arrangements. In Bollinger, one electrode assembly forms a wall of the crossflow chamber and the second electrode is located in the filtrate chamber. This arrangement causes the slurry material passing through the crossflow chamber to flow between the two electrodes see FIG. 1 of Bollinger and the discussion in the Summary of the Invention, Column 2, line 57 to Column 3, line 32.

Objects of the present invention include the enhancement of crossflow and dead-end electrofiltration by reducing energy requirements, improving filtration efficiency, reducing filtration time, reducing costly filter cleaning steps, and reducing filter fouling.

DETAILED DESCRIPTION OF THE INVENTION AND PREFERRED EMBODIMENT

Figure 1:
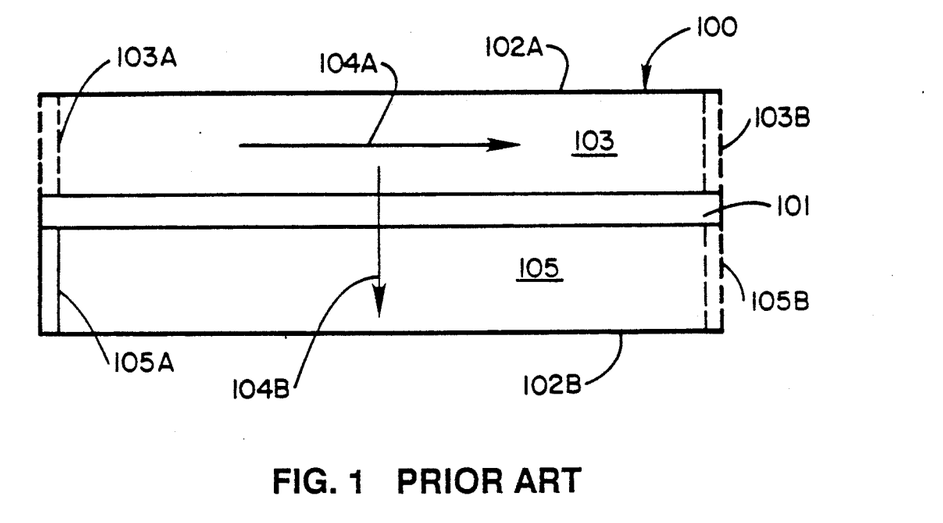
FIG. 1 is a schematic side view of a typical prior art crossflow apparatus.
Figure 2:
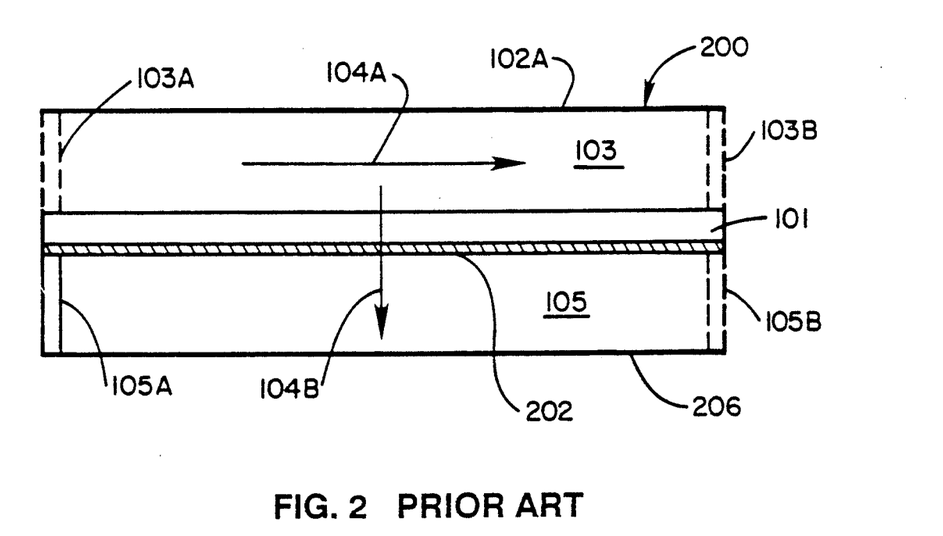
FIG. 2 is a schematic side view of another typical prior art crossflow apparatus.

The essential feature of the system is the unique arrangement of two electrodes to induce an electric field and an electric current across the filter system. The location of the electrodes is an important feature of the invention. FIGS. 1 and 2 illustrate two prior art crossflow electrodewatering arrangements that provided improved separation of solids and liquids.

The terms filter and membrane have their usual meanings as used herein. However, to facilitate discussion of the invention filter will be used to designate a filter or membrane, and electrofilter to designate an electrofilter or electromembrane. Similarly, the invention is useful for slurries, solutions, and suspensions but the term suspension will be used herein and will be understood to include all types of liquid inputs. The term suspension is further defined to include macromolecules in solution, (e.g. proteins in water) and salts in solution (e.g. NaCl).

FIG. 1 is a schematic representation of a side view of a typical prior art crossflow apparatus 100. A filter 101 is located between two spaced apart electrodes 102A, 102B. The slurry or suspension to be dewatered flows from inlet 103A through crossflow chamber 103, between electrode 102A and filter 101, as indicated by arrow 104A, and out through outlet 103B. Liquid in the slurry flows through the filter 101 as shown by arrow 104B into a filtrate chamber 105 to filtrate outlet 105B. 105A may be a wall or an inlet for additional liquid.

A variation of the prior art apparatus is illustrated schematically in FIG. 2 as apparatus 200. The electrode 202 on the filtrate chamber side of the filter 101 is placed adjacent to the filter 101. Electrode 202 is of course pervious to the filtrate. Wall 206 may form a boundary of chamber 105.

Figure 3:
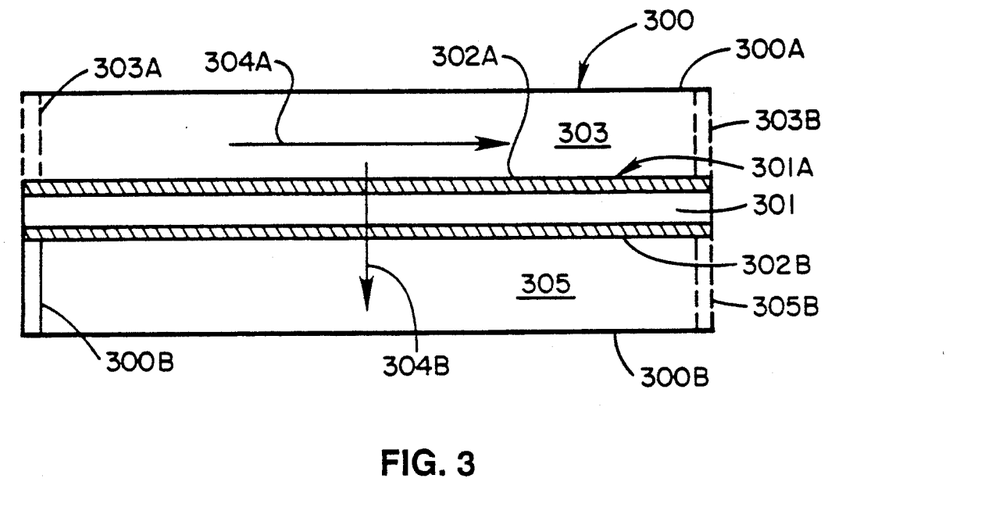
FIG. 3 is a schematic representation of one embodiment of the invention.
Figure 4:
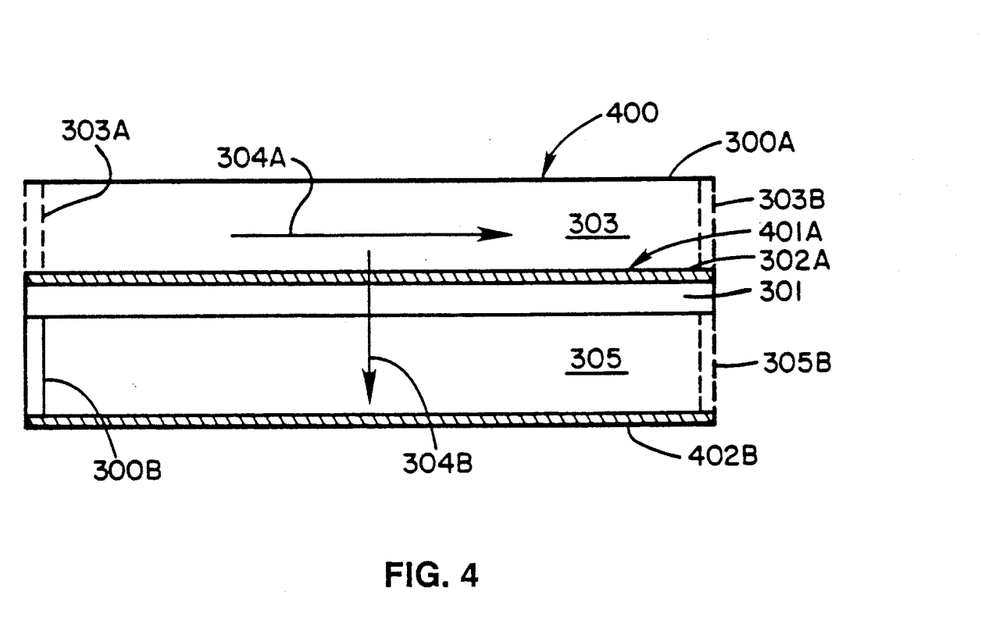
FIG. 4 is a schematic representation of another embodiment of the invention.

FIGS. 3 and 4 illustrate two modifications of the invention. In FIG. 3 the apparatus 300 includes a housing 300A, 300B that has disposed within it an electrofilter 301A that divides the housing into crossflow chamber 303 and filtrate chamber 305. The filter is composed of a first electrode 302A, a filter (or membrane) 301, and a second electrode 302B. The electrodes 302A, 302B may be integrally bonded to the filter 301 or only in physical contact therewith. A suspension is pumped into chamber 303 under pressure at inlet means 303A and flows across the electromembrane 301A in direction 304A. Filtrate flows through the filter 301A due to pressure in chamber 303 in the direction 304B and into filtrate chamber 305. Filtrate is removed at outlet means 305B. The portion of the suspension reduced in liquid content is removed at outlet means 303B.

FIG. 4 illustrates an alternate form of the invention. The apparatus 400 has most features in common with that of FIG. 3. However, electrofilter 401A now is composed only of a first electrode 302A and a filter material 301. The electrode 302A may be integrally bonded to the filter 301 or only in contact therewith. The second electrode 402B is now located away from the filter 301 and may form a portion of the walls of chamber 305 or a portion of outlet means 305B.

A significant difference between the prior art and the present invention is obvious from FIGS. 1-4. In the prior art the suspension always passes between the electrode and the filter in the crossflow chamber. While in the invention the electrode in the crossflow chamber is always on the surface of the filter.

Figure 5:
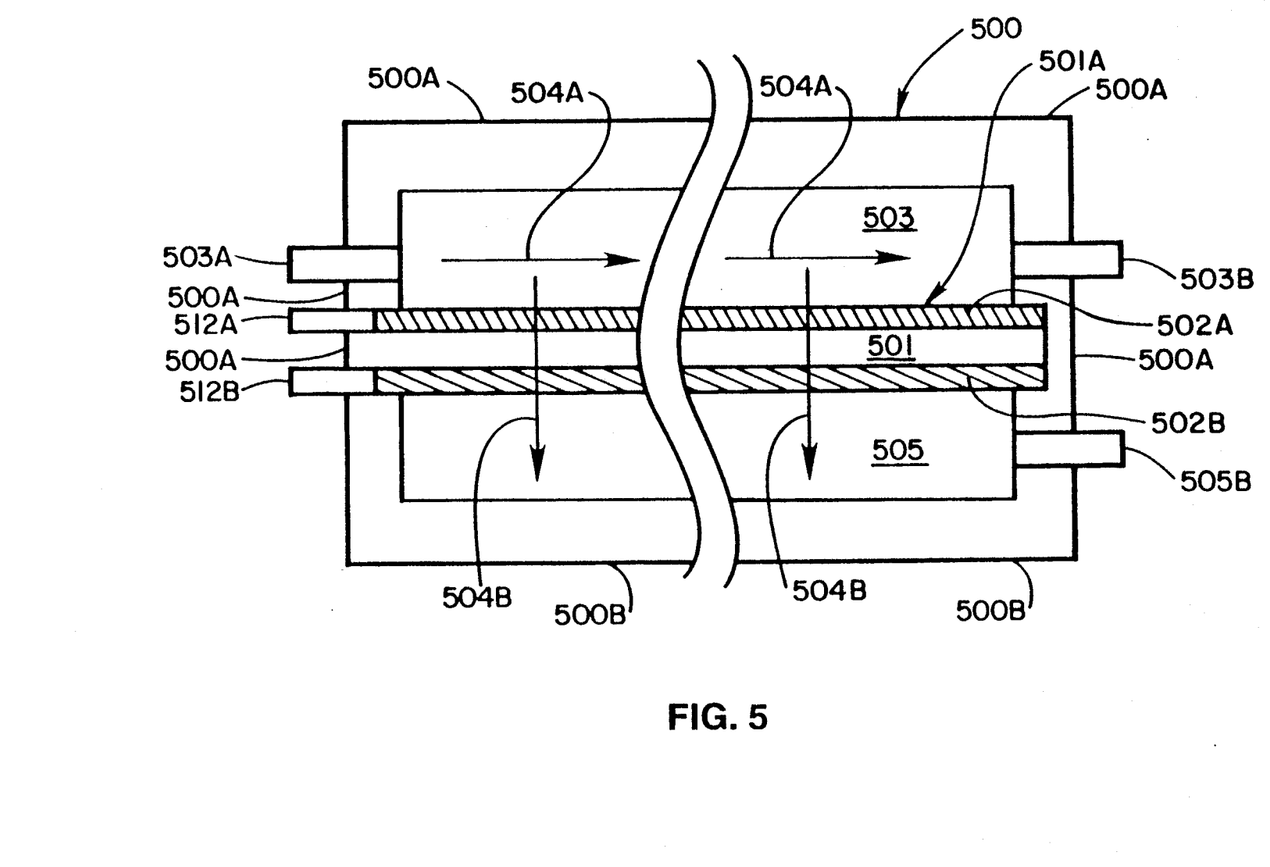
FIG. 5 is a detailed cutaway side view of the apparatus of the invention.

Referring to FIG. 5, the filter 500 comprises of a walled container (filter housing) 500A, 500B that has disposed within it the electrofilter 501A of the invention that divides the volume within the walled container 500A into a crossflow chamber 503 and biltrate chamber 505. The electrofilter 501A comprises of filter 501 having an electrode 502A disposed on the surface that faces crossflow chamber 503. Another electrode 502B is disposed on the surface that faces chamber 505. Chamber 503 has an inlet end and an outlet end where connection is made with inlet means 503A and outlet means 503B respectively.

Figure 6:
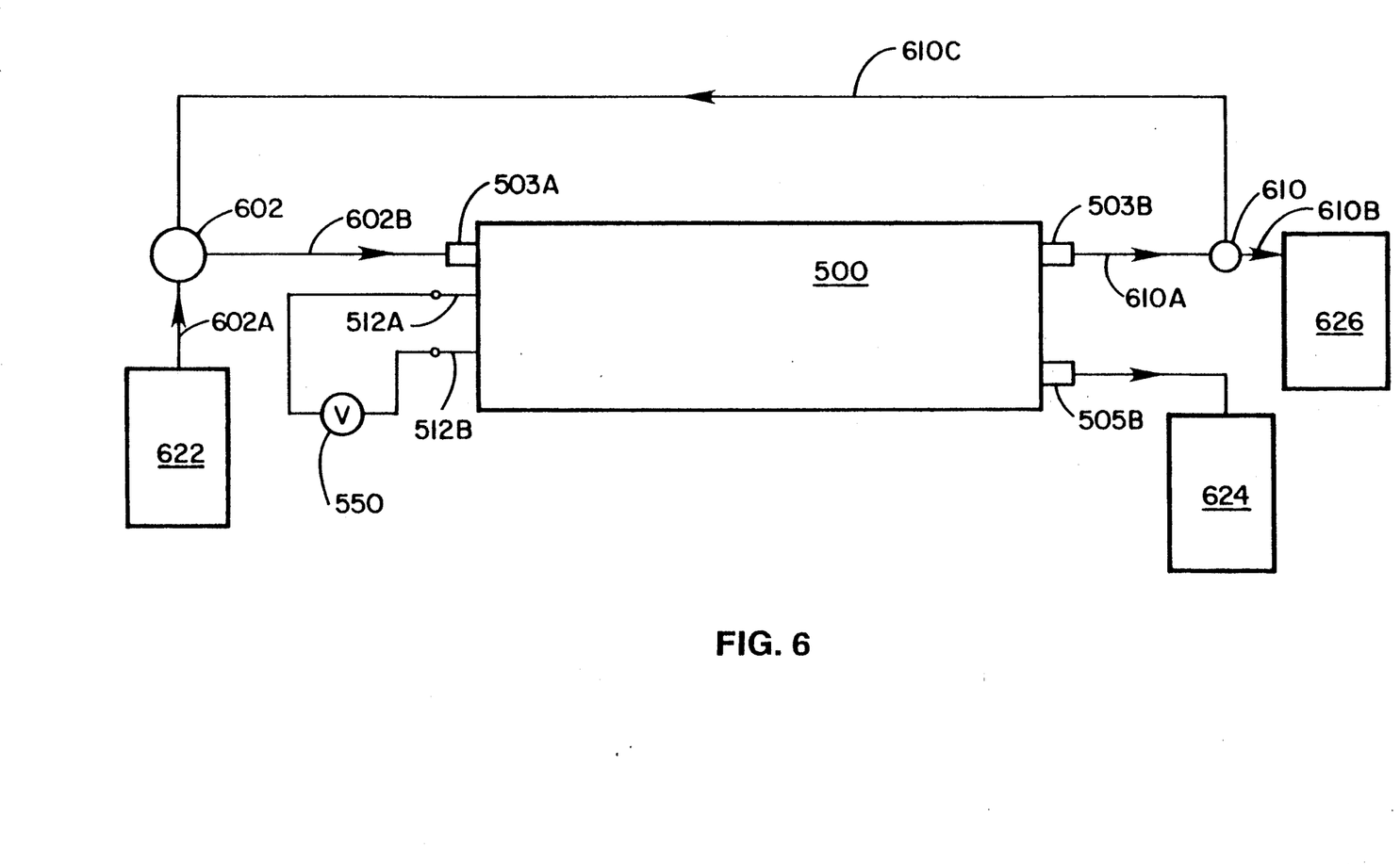
FIG. 6 is a detailed view of another embodiment of the invention showing connections for fluid flow.

A general description for the apparatus 500 for continuously removing liquid or fractionating from an aqueous suspension includes a filter housing 500A, 500B; an electrofilter 501 disposed within the housing to provide a crossflow chamber 503 and filtrate chamber 505 within the housing; means 503A for supplying a suspension to the crossflow chamber 503 and means 503B removing a suspension reduced in liquid content from the crossflow chamber 503; both means may be disposed so as to provide a crossflow 504A of the suspension across the surface of the electrofilter 501 or disposed to provide a batch process with optional stirring means; and outlet means for removing liquid from the filtrate chamber. Electrical means 512A, 512B are used for supplying electrical energy to the electrodes 502A, 502B from electrical source 550 (FIG. 6). The electrofilter 501A is composed of a first electrode 502A, disposed on the crossflow chamber side of the filter 501 so as to be in contact with the membrane and a second electrode 502B is disposed on the opposite side of the filter. Included are means 503A for supplying a suspension to the crossflow chamber 503 at one end of the chamber and means to remove a portion of the suspension depleted in liquid from another end of the crossflow chamber 503, both means may be disposed so as to provide a crossflow 504A of the suspension along the first electrode and filter or disposed to provide a batch process with optional stirring means; and outlet means 505B for removing filtrate from the filtrate chamber. The filtrate flows in the direction indicated by arrow 504B. When used as a continuous crossflow apparatus the apparatus 500 and electrofilter 501 are preferably elongated in the direction 504A so as to provide increased area and improved filtration.

Referring now to FIG. 6, the filter unit of the invention was used together with a pump 602, input reservoir 622, permeate reservoir 624, waste reservoir 626, and associated piping to perform experimental tests. In operation the suspension is pumped from input reservoir 622 through pipe 602A to pump 602 and thence through pipe 602B to inlet means 503A. The suspension concentrated in suspended material and depleted in liquid exits at outlet means 503B, by pipe 610A to valve 610 where all or at least a portion thereof may flow by pipe 610B to waste reservoir 626. Alternatively all or a portion of slurry from valve 610 may flow by recirculator pipe 610C to pump 602 for mixing with slurry from pipe 602A. Control tests were performed by replacing the electrofilter with prior art filter designs as in FIGS. 1 and 2. Various combinations of electromembrane apparatus in series, parallel and combinations thereof will be apparent to those skilled in the art.

Figure 7:
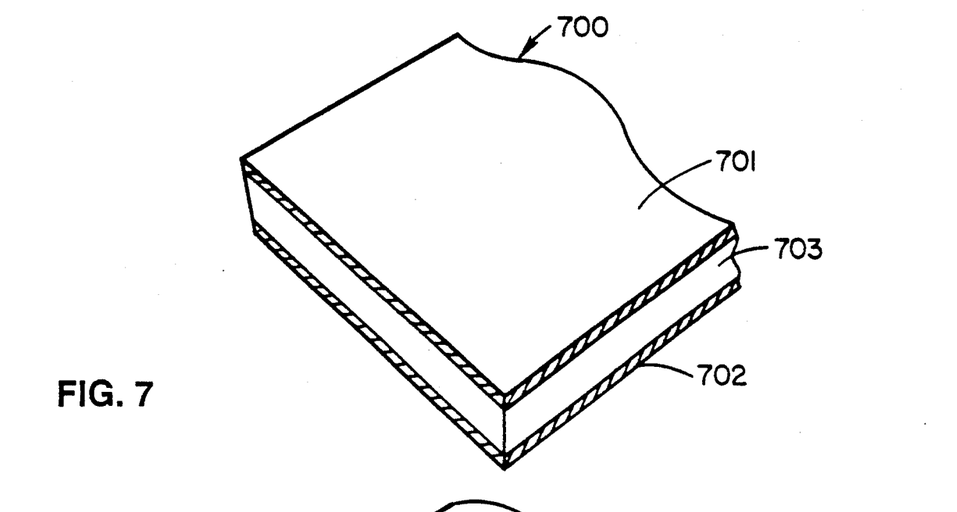
FIG. 7 illustrates one embodiment of the electrofilter of the invention where porous electrodes are adjacent to the filter.
Figure 8:
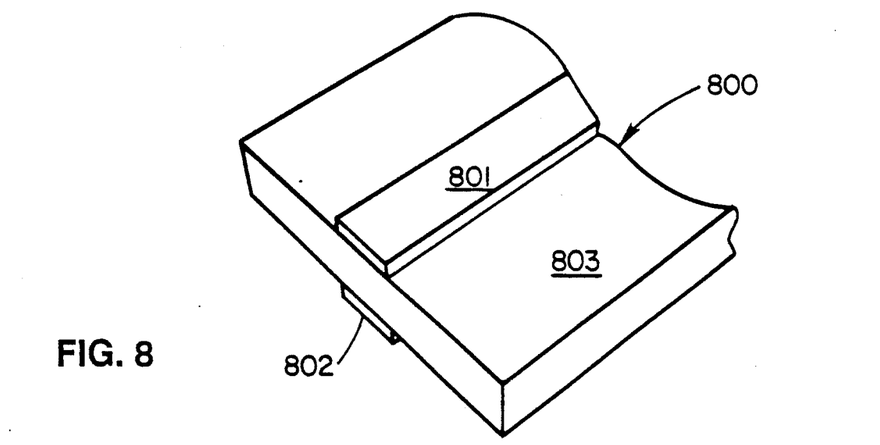
FIG. 8 illustrates another embodiment of the invention where a strip is used for each electrode.
Figure 9:
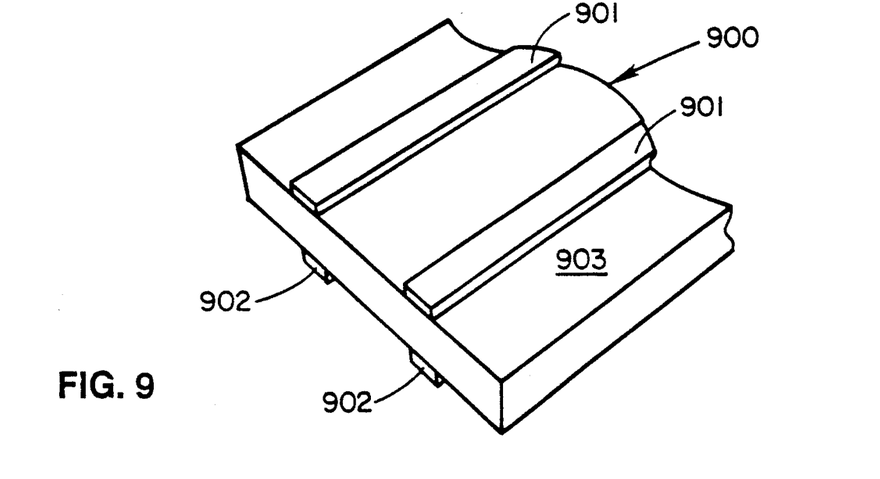
FIG. 9 illustrates another embodiment of the invention where two strips are used for each electrode.

FIGS. 7, 8, and 9 illustrate several variations in the design of the electromembrane or filter. FIG. 7 illustrates porous electrodes 701, 702 that are disposed on both sides of the filter 703 of electrofilter 700. FIG. 8 illustrates the modification where a strip is used for each electrode 801, 802 on filter 803 for electrofilter 800. This is the configuration used in the examples herein. FIG. 9 illustrates the modification for electrofilter 900 where a plurality of two or more strips are used for the first electrode 901 and the second electrode 902, that are disposed at opposite sides of filter 903.

Figure 10:
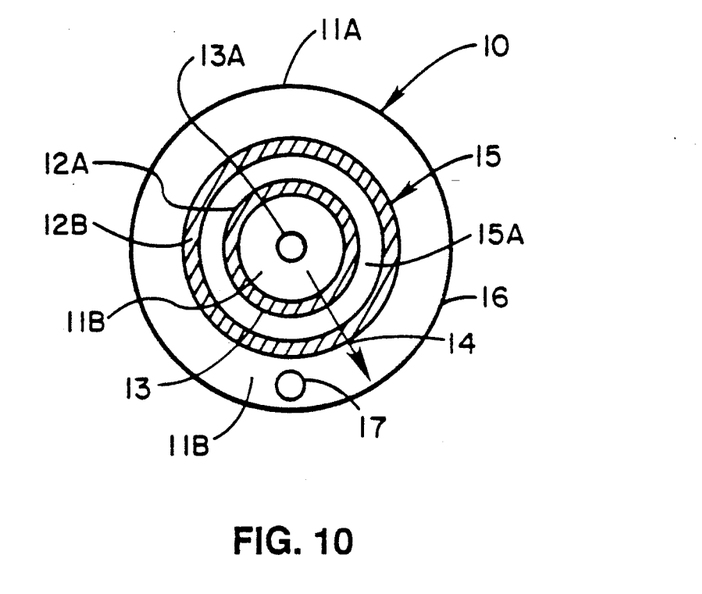
FIG. 10 and 11 illustrate further embodiments of the invention where the electrofilter is tubular.

FIG. 10 is a cutaway end view and illustrates the embodiment where the filter apparatus 10 is in the form of a cylinder or tube. Looking toward the inlet end of the apparatus 10 the tubular housing 11A and end housing 11B are seen. Housing 11B provides support for tubular layers and keeps them in position. Inlet means 13A admit a suspension into the cylindrical crossflow chamber 13 defined by first tubular electrode 12A and end housing 11B. The suspension flows up out of the drawing as viewed and out outlet means 13B (not shown) located oppositely to inlet means 13A. Tubular electrofilter 15 comprises electrode 12A and second tubular electrode 12B disposed on opposite sides of tubular filter 15A. Filtrate flows in direction 14 from crossflow chamber 13 to filtrate chamber 16. The filtrate chamber 16 is tubular and enclosed by housing 11A, 11B and second electrode 12B. Filtrate may be removed at filtrate outlet means 17.

Figure 11:
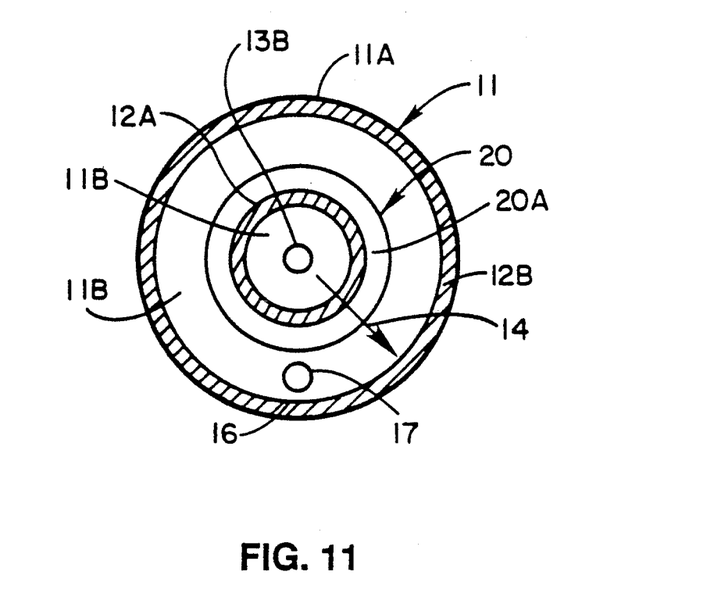

A modification of apparatus 10 is shown in FIG. 11 as apparatus 11. Where the second electrode 12B is now not in contact with the filter 20A. FIG. 11 is a cutaway end view of the apparatus viewed toward the crossflow outlet end. In operation the suspension enters at inlet means 13A (as in FIG. 10) not shown here and into the figure. The suspension reduced in liquid content is removed at outlet means 13B (as in apparatus 10). Filtrate moves from the cylindrical crossflow chamber defined by electrode 12A and end housing 11B through the electrofilter 20 into tubular filtrate chamber 16. The filtrate chamber 16 is defined by the surfaces of filter 20A, end housing 11B and second tubular electrode 12B. Housing 11A and 11B provide support for the tubular filter and electrodes. Filtrate may be removed at filtrate outlet means 17. The electrofilter 20 in this configuration is made up only of electrode 12A and filter 20A.

While FIGS. 9 and 10 show the first electrode as a tubular electrode 12A covering the whole surface of the filter 15A, 20A, strips, webs, electrodeposited layers, screens, wires and the like covering all or only a portion of filter 15A, 20A may be used. In addition to the flat plate and concentric cylindrical (tubular) designs described herein spiral wound and hollow fibers with proper electrode placement may also be used. These are discussed further below.

Referring to FIG. 5, filter 501 may be composed of any typical filter or membrane materials that are essentially nonconductive. Typical filter materials include cellulose acetate, polyvinyl acetate, polysulfone, polyesters, composites, ceramics and sintered materials and the like. The electrode material can be gold, platinum, iridium coated materials and other insoluble metal electrodes as well as conductive ceramics Therefore, silver, iron and similar corrodible or soluble materials are not preferred but could be used. Microfiltration, ultrafiltration and reverse osmosis membranes and the like are all useful in the present invention when properly combined with electrodes to form an electrofilter. Electrodes 502A, 502B may be in the form of strips, webs, electrodeposited layers, screens, wires, and the like. Presently a strip (or wire) or a plurality of strips (or wires) disposed in the direction of flow of the suspension in the crossflow chamber are preferred. However, any configuration of the electrode that provides a charge to the crossflow side of the filter and appropriate current flow between the first and second electrodes is contemplated.

Generally, only a low voltage in the range of 1½ to 100 volts is used to energize the electrofilter 501A depending on the properties of the suspension (pH, conductivity, salt content, etc.) and the properties of the filter. Electrofilter 501A uses only a small amount of current in operation in the order of 5 milliamps to several amperes. Therefore energy usage is typically 6–10 watts per square foot of membrane. This figure is very low and illustrates the economic advantages of the invention. Pressures usually used in the industry may be used with the electrofilter. If desired, in addition to applying a pressure at the crossflow chamber, a vacuum may be applied to the filtrate chamber to augment filtration.

A Millipore Minitan@ unit with a membrane was used for the experiments set up as in FIG. 5. This type of unit allows testing of various arrangements of membranes. A peristaltic pump was used to draw fluid samples from an unpressurized reservoir. Each suspension sample was pumped through the Minitan@ unit in a crossflow arrangement at a constant flow rate. Concentrated material was returned to the input side and filtrate was collected in a separate reservoir. The area of a single membrane unit used in the examples below is about 60 cm$^2$. Two platinum strips were used as electrodes to produce an electric current across the membrane system. The location of the electrodes is an important factor as discussed herein.

EXAMPLE 1

Figure 12:
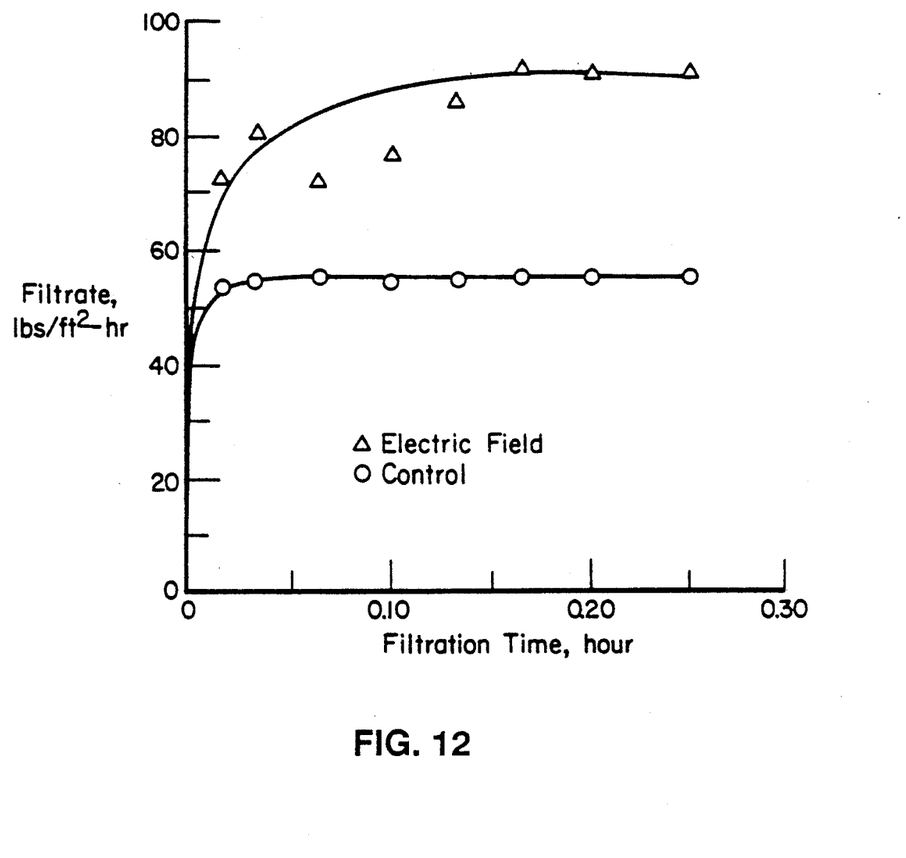
FIG. 12 and 13 are graphs showing the advantageous filtering of tap water by apparatus over a control.

Experiments were conducted with distilled water to obtain baseline flux data. FIG. 12 shows the results which indicate that in the presence of an electric field the flux can almost be doubled. Feed rate was 100 ml per hour.

Figure 13:
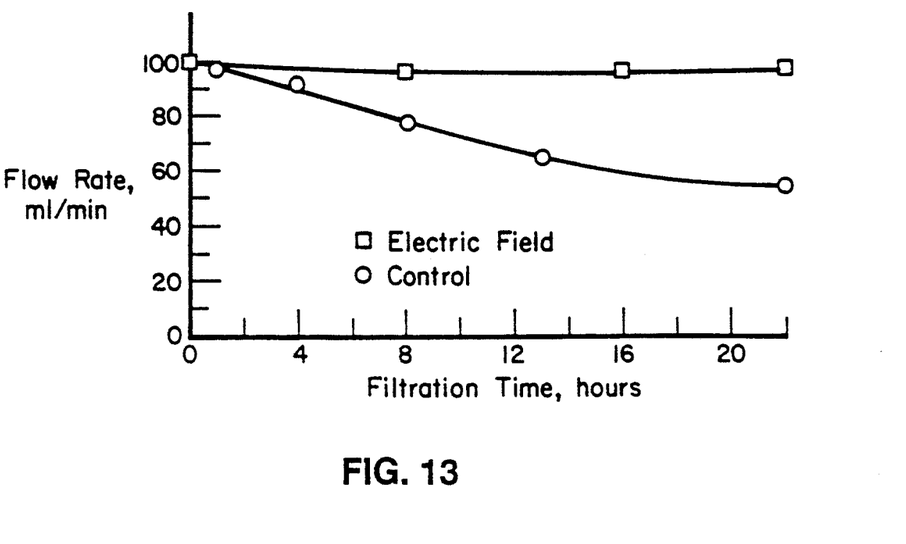

Longer duration results are shown in FIG. 13. The graph has been normalized for a 100 ml/minute flow rate. Initial pressure was 2 psi that increased to 25 psi when filtering using an electrofilter and 38 psi when filtering without the electrofilter. The configuration used for this latter experiment was similar that illustrated in FIG. 5 where the second electrode is in contact with the filter. This configuration gave significant results over the control as shown in the graph. Pore size of the membrane used as a filter was again 0.2 micron.

EXAMPLE 2

A set of experiments were conducted as in Example 1 with tap water to determine the correct placement of the electrodes. Spacers were used to move the electrodes to various distances from the filter. Flow curves were plotted that indicated that the best results were obtained when the electrode on the crossflow side of the filter (the first electrode) was in contact with the filter. The placement of the electrode on the filtrate side (second electrode) was not critical and could be placed in contact with the filter or further away in the filtrate chamber.

EXAMPLE 3

This example used A-13 streptomyces complex as the material to be filtered. Five liters of A-13 complex were freshly prepared by usual fermentation techniques. The cells are filamentous in nature. The material was used with the apparatus of FIG. 5. Pressure was 4 psi and feed rate 300 ml/minute, voltage was 30 volts with about 130 ma of current through the electrofilter. The membrane fouled very quickly with this material. After ten minutes the rate of dewatering in the presence of an electric field is about 7 lb/ft$^2$/hr. The control using the same configuration but without the application of an electric field resulted in a rate of only 3 lb/ft$^2$/hr in the same time period. At the end of one hour, the dewatering rate in the presence of an electric field in configuration of the present invention was one and one half times that of the control. Fouling at the membrane can thus be controlled during broth concentration.

EXAMPLE 4

An experiment was performed where the electric field was on and then turned off for a time and then turned on again. Tap water was used for the experiment. The experiment was conducted for a total of 2.5 hours. Pressure used was 2.5 psi and feed rate was 200 ml/minute. Voltage was 40 volts and current was 0.2 ma.

The following results were noted. It takes approximately 0.5 hours for the flow rate to drop to the control level when the power is turned off. Once the membrane is fouled, the reapplication of the electric field does not totally eliminate the fouling on the membrane. For example, after the electric power had been turned off, reapplying the electric field cause the flow rate to increase from 310 to 315 lb/hr/ft$^2$; however, it did not increase to the initial 330 lb/hr/ft$^2$. The experiment further suggested that the entire membrane surface does not need to have a conductive layer thereon to control fouling; however there must be enough charge carriers in the feed to affect the interface.

EXAMPLE 5

Figure 14:
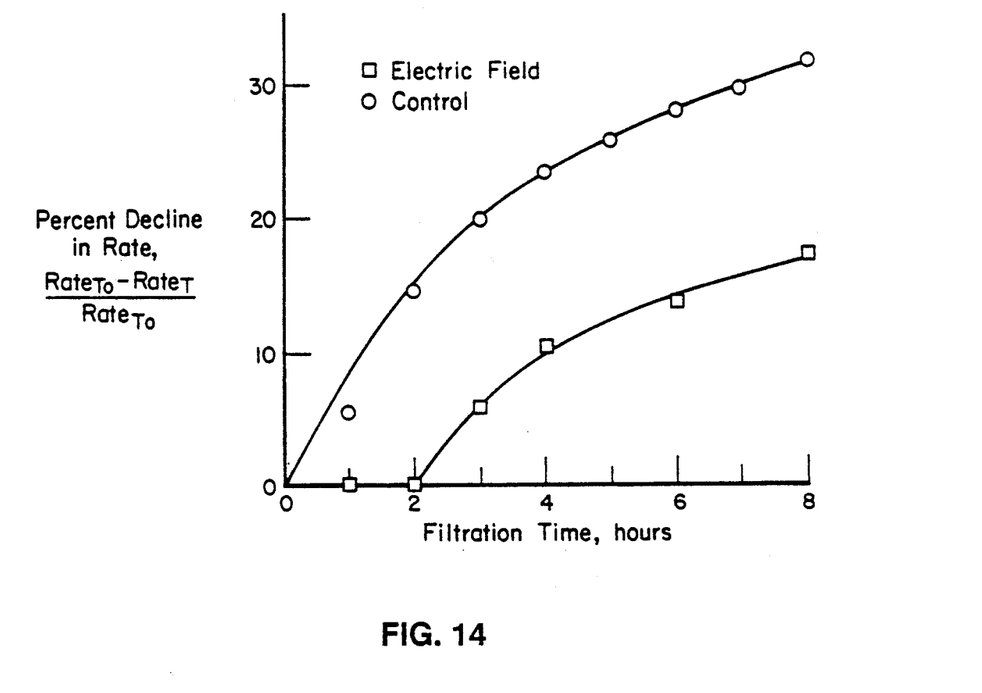
FIG. 14 is a graph showing the advantageous filtering of skim milk by the apparatus over a control.

An apparatus similar to FIG. 5 was used for the example. The filter was a 30,000 molecular weight cutoff ultrafiltration membrane. The suspension material was skim milk. Pressure was increased from 25 to 50 psi as the experiment progressed. Voltage similarly increased from 20 volts to 50 volts and the current from 50 to 60 ma. Results are shown in FIG. 14. The figure shows the percent decline in flow rate through the filter versus filtration time. The advantages of the invention are clearly demonstrated in that the decline in rate is substantially less with the use of the electrofilter.

EXAMPLE 6

In order to study the antifouling effect in the presence of an electric field the following test was performed. The plate of the Minitan@ unit was drilled to accept a Nikon 100X microscopic lens with a television camera attachment. Total magnification observable on the television screen was 4000X. This allowed the detailed observance of the crossflow surface of the filter.

The test sequence was as follows. First the filter surface was flushed with water. Then a suspension was allowed to flow with the electrofilter energized. Finally, the electric power was turned off while the suspension continued to flow. When the electrofilter was energized some individual particles deposited but did not agglomerate. In the absence of an electric field, the particles deposited and formed agglomerates on the surface of the filter at particular locations. The fouling behavior appeared to occur as nucleation or dendritic growth from a nucleating site. This test clearly demonstrated the advantages of the invention since the effects of the use of the field could be easily observed.

EXAMPLE 7

A latex suspension was tested as in Example 1. Pressures were 2-3 psi. Voltage was 40 volts and current was 170-200 ma. The experiment was conducted for a period of 7 hours. The electrofilter gave significant improvement over the control after this time. The electrofilter gave 40 percent more filtrate product than the control.

EXAMPLE 8

Hollow fiber simulation experiment

Figure 16:
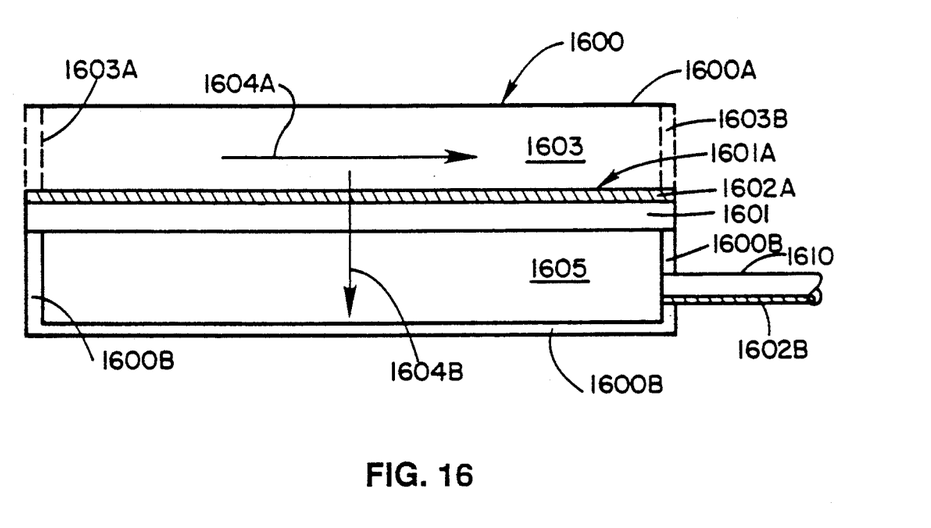
FIG. 16 is a representation of yet a further embodiment of the invention with which a simulated test for the use of hollow fibers was performed.

A simulated test for performance using an array of hollow filters was completed with an apparatus 1600 as shown in FIG. 16. A housing 1600A and 1600B has disposed within it an electrofilter 1601A that divides the housing 1600A, 1600B into crossflow chamber 1603 and filtrate chamber 1605. Electrofilter 1601A is comprised of a filter 1601 and a first electrode 1602A. A second electrode 1602B is disposed at a greater distance from the first electrode 1601A in filtrate outlet tube 1610.

A suspension, tap water, was pumped into the crossflow chamber 1603 under pressure at inlet means 1603A. Tap water flowed through chamber 1603, across electrofilter 1601A in the direction 1604A. Filtrate flowed through the electrofilter 1601A due to pressure in chamber 1603 in the direction 1604B and into filtrate chamber 1605. Filtrate is removed at the filtrate outlet tube 1610. The portion of the tap water reduced in liquid content is removed at outlet means 1603B.

A first electrode 1602A as a cathode strip was placed right on the surface of the crossflow side filter 1601 and a second electrode 1602B as an anode was placed in the permeate outlet tube 1610 far removed from the filter. The experiment was conducted for 33.5 hours at 50 volts and 3.8 milliamps current. The normalized filtrate rate at 33.5 hours was 0.05 units, but filtrate rate with an electric field was 0.3 units indicating almost 380 percent improvement over the control experiment.

This experiment confirmed that the electrofilter technology is applicable to hollow fiber design. This is true because when hollow fibers are used the hollow fibers can be coated with an electrode material on the outside. The second electrode would then be located far away, as in the above test. When coated hollow fibers are used the crossflow portion of the chamber would be the volume on the outer portion of the fibers. The filtrate chamber would be the volume within each fiber. The hollow fibers would be attached to an input header and an output header as is known to those skilled in the art of hollow fibers. A preferred location for the second electrode is the general area where the permeate leaves the hollow fibers such as the output header that collects the flow from all the fibers.

In general for nonpermeable electrodes, electrode area and type of electrode determine the economics of the process. The experiments cited in Examples 1–8 were performed with strips or wires. Their area varied from 0.12 percent–5 percent of the total filter surface area. 24 gauge platinum wires were used as electrodes. Rectangular strips were also used. Tests with plasma polymerized electrodes were conducted with the filter totally covered by metal electrodes but still maintaining the open pores.

CONDUCTIVE FILTER OR MEMBRANE

Figure 15:
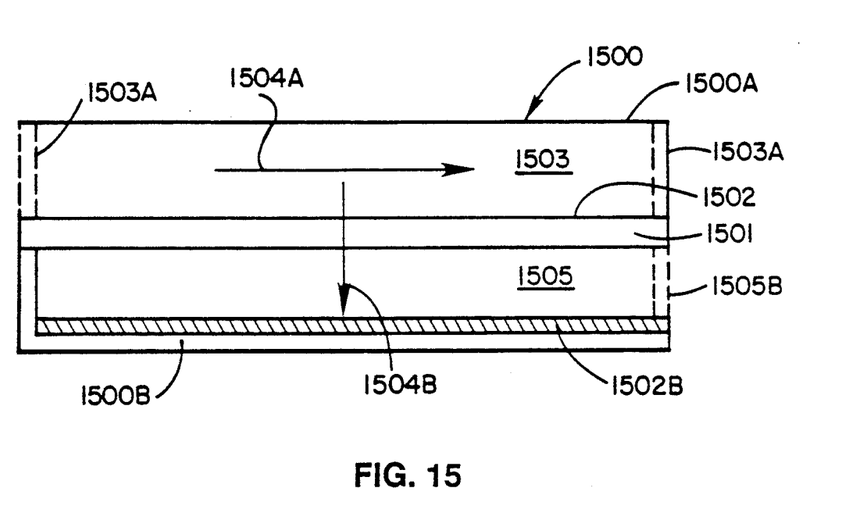
FIG. 15 is a representation of a further embodiment of the invention where the filter is conductive.

Referring now to FIG. 15. FIG. 15, illustrates a further embodiment of the invention in addition to those discussed earlier in discussing the embodiments shown in FIGS. 4 and 11; for example, the filter is not in contact with the second electrode (e.g. 402B of FIG. 4). For FIGS. 4 and 11, the filter can be conductive (if properly insulated, as appreciated by those skilled in the art) and can itself act as the first electrode. This embodiment, as shown in FIG. 15, can be generally described as the apparatus 1500. A housing 1500A and 1500B has disposed within it an electrofilter 1501 that divides the housing 1500A, 1500B into crossflow chamber 1503 and filtrate chamber 1505. Electrofilter 1501 is conductive and presents a conductive surface 1502 to the crossflow chamber 1503 and acts as the first electrode in addition to its action as a filter.

Typical filter materials for the embodiment using a conductive filter include conductive ceramics, porous metallic materials, and porous conductive polymers. The second electrode may use gold, platinum, iridium coated materials and other insoluble metal electrodes as well as conductive polymers.

The surface 1502 is analogous to where an electrode has been deposited over the whole surface of the filter. A second electrode 1502B is disposed at a distance from the filter 1501 in the filtrate chamber 1505. A suspension is pumped into the crossflow chamber 1503 under pressure at inlet means 1503A and flows through the chamber 1503, across filter 1501 in the direction 1504A. Filtrate flows through the filter 1501 due to pressure in chamber 1503 in the direction 1504B and into filtrate chamber 1505. Filtrate is removed at outlet means 1505B. The portion of the suspension reduced in liquid content is removed at outlet means 1505B.

This embodiment utilizing a conductive filter likewise is useful as a flat plate, tubular, spiral wound, and hollow fiber design. Appropriate insulation to separate the filter from the second electrode would be needed.

All materials actually tested herein had a negative zeta potential. For these materials, the electrode facing the crossflow chamber must be a cathode (negative polarity) and must be in physical contact with the filter or be a part of the filter. The other electrode is then the anode (positive polarity) and is located on the opposite side of the filter in the filtrate chamber. The anode may or may not be in contact with the filter.

Zeta potential may be modified to some extent by additives such as salts that affect the ionic strength of the solution. Zeta potential appears to be inversely affected by ionic strength. As ionic strength increases the zeta potential decreases. In addition to changes due to changes in ionic strength, zeta potential can also be adjusted by varying temperature and pH. Generally, as the temperature increases, the zeta potential tends to increase. Changes in zeta potential due to pH changes are more complicated and depend on the material.

If materials such as clays are in the suspension that result in the suspension having a positive zeta potential, then the electrode in the crossflow chamber must be the anode (positive potential) and must be in contact with the filter. The other electrode is then the cathode (negative polarity) and is located on the opposite side of the membrane in the filtrate chamber. The cathode may or may not be in contact with the filter.

It is thus, apparent that the electrode in the crossflow chamber (first electrode) must always be in contact with the filter or be integral to the filter itself. The electrode in the output chamber does not have to be in contact with the filter but can be located to give the best flow rate for the apparatus or other advantageous characteristics desired.

Continuous removal of liquid from a dead-end chamber is also possible with the present invention. Use of a dead-end chamber is also known as batch processing. For convenience of discussion herein the crossflow chamber will be understood to be a dead-end chamber when batch processing of liquids is used. In that case removal of the concentrated suspension is not on a continuous basis as in the crossflow method. Mixing in the chamber may, however, optionally be used to provide for suspension flow past the electrofilter to enhance filtrate flow.

The invention further provides a method for continuously removing liquid from an aqueous suspension. The suspension may have small amounts of polar liquids other than water dispersed therein without adversely affecting the effectiveness of the method. These polar liquids include alcohols, acetones and the like.

A method for separating a liquid from an aqueous suspension while reducing membrane fouling comprises providing a filtering apparatus having an electrofilter disposed therein; pumping the aqueous suspension into the filtering apparatus at a pressure adapted to cause flow of filtrate through the electrofilter; and concurrently with supplying electrical energy to the electrofilter at a voltage adapted to reduce fouling of the filter. The additional steps of removing the aqueous suspension reduced in liquid content from the apparatus and removing filtrate from the apparatus complete the method. The additional step of recirculating at least a portion of the aqueous suspension reduced in liquid content to be pumped into the apparatus may be used to further reduce the liquid content. Alternatively, two or more stages of the apparatus may be placed in series to achieve lower liquid levels. The process may be a batch or continuous crossflow process. The method may utilize the several forms of the electrofilter described herein.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. An apparatus for removing liquid from an aqueous suspension comprising:

a. a filter housing;

b. a filter disposed within the housing to form a crossflow chamber and a filtrate chamber within the housing, wherein the filter is conducting and functions as a first electrode;

c. a second electrode disposed on the filtrate chamber side of the filter but not in contact therewith;

d. means for supplying a suspension to the crossflow chamber at one end of the chamber where the means consists of a single inlet supply means located upstream from the crossflow filter, and means to remove a portion of the suspension depleted in liquid from another end of the crossflow chamber; and e. outlet means for removing filtrate from the filtrate chamber.

2. The apparatus of claim 1 further comprising means for supplying electrical energy to the electrodes.

3. The apparatus of claim 1 wherein the filter is a flat plate.

4. The apparatus of claim 1 wherein the filter and second electrode are disposed concentrically as tubes in the housing.

5. The apparatus of claim 1 wherein the filter and second electrode are spirally wound.

6. The apparatus of claim 1 wherein the filter comprises an array of hollow fibers.

7. The apparatus of claim 1 wherein the filter is comprised of a conductive ceramic.

8. The apparatus of claim 1 wherein the filter is comprised of a metal.

9. The apparatus of claim 1 wherein the filter is comprised of a conductive polymer.

10. The apparatus of claim 1 wherein the second electrode comprises a flat plate.

11. The apparatus of claim 1 wherein the second electrode comprises one or more strips.

12. The apparatus of claim 1 wherein the second electrode comprises a wire.

13. An apparatus for removing liquid from an aqueous suspension comprising:

a. a filter housing;

b. an array of hollow fibers disposed within the housing to form a crossflow chamber defined by the outside of the fibers and a filtrate chamber defined by the inside of the fibers, wherein a first electrode is disposed on the outside of the fibers;

c. filtrate header means for isolating and collecting the flow of filtrate from the hollow fibers;

d. means for supplying a suspension to the crossflow chamber at one end of the chamber where the means consists of a single inlet supply means located upstream from the array of hollow fibers, and means to remove a portion of the suspension depleted in liquid from another end of the crossflow chamber;

e. filtrate outlet means for removing filtrate from the filtrate header means; and f. a second electrode disposed on the filtrate side of the filter at the filtrate outlet means.

14. A method for separating a liquid from an aqueous suspension while reducing membrane or filter fouling comprising;

a. providing a filter apparatus having an electrofilter disposed therein wherein the electrofilter divides a housing of the apparatus into a crossflow chamber and a filtrate chamber, whereby there is further provided an electrofilter comprising a filter that is conductive and also functions as a first electrode that faces the crossflow chamber and a second electrode disposed in the filtrate chamber, whereby there is further provided a means for supplying a suspension to the crossflow chamber at one end thereof where the means consists of a single inlet supply means located upstream from the electrofilter, and means for removing a portion of the suspension depleted in liquid from another end of the crossflow chamber, wherein there is further provided an outlet means for removing filtrate from the filtrate chamber; and further providing means for supplying electrical energy to the electrofilter;

b. pumping the aqueous suspension into a single inlet supply means located upstream from the electrofilter in the filtering apparatus at a pressure adapted to cause flow of filtrate through the electrofilter;

c. concurrently with step b supplying electrical energy to the electrofilter at a voltage adapted to reduce fouling of the filter;

d. removing filtrate from the filtrate chamber; and e. removing the aqueous suspension reduced in liquid content from the crossflow chamber.

15. The method of claim 14 wherein the process is a batch process.

16. The method of claim 14 wherein the process is a continuous crossflow process.

17. The method of claim 14 further comprising the additional step of recirculating at least a portion of the aqueous suspension reduced in liquid content to the input of the filtering apparatus.

* * * * *

UNITED STATES PATENT AND TRADEMARK OFFICE
CERTIFICATE OF CORRECTION

PATENT NO. : 5,064,515
DATED : November 12, 1991
INVENTOR(S) : Muralidahara Harapanahalli It is certified that error appears in the above—identified patent and that said Letters Patent is hereby corrected as shown below:

Column 4, line 14, delete "biltrate" insert --filtrate--

Column 10, line 12, after "It is" insert a comma --,--

Signed and Sealed this

Fifteenth Day of June, 1993

Attest:

MICHAEL K. KIRK

Attesting Officer

Acting Commissioner of Patents and Trademarks